(12) United States Patent
Nakase et al.

(10) Patent No.: US 9,816,743 B2
(45) Date of Patent: Nov. 14, 2017

(54) ELECTRIC MOTOR DRIVE DEVICE AND AIR-CONDITIONING APPARATUS OR REFRIGERATING AND AIR-CONDITIONING APPARATUS USING THE SAME

(71) Applicant: Mitsubishi Electric Corporation, Tokyo (JP)

(72) Inventors: Shusaku Nakase, Tokyo (JP); Shigeo Takata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/319,413

(22) PCT Filed: Aug. 22, 2014

(86) PCT No.: PCT/JP2014/071948
§ 371 (c)(1),
(2) Date: Dec. 16, 2016

(87) PCT Pub. No.: WO2016/027357
PCT Pub. Date: Feb. 25, 2016

(65) Prior Publication Data
US 2017/0138654 A1    May 18, 2017

(51) Int. Cl.
*H02P 27/00* (2006.01)
*F25B 49/02* (2006.01)
(Continued)

(52) U.S. Cl.
CPC ............ *F25B 49/025* (2013.01); *H02P 21/14* (2013.01); *H02P 27/08* (2013.01); *F25B 2600/021* (2013.01); *F25B 2700/1931* (2013.01)

(58) Field of Classification Search
CPC ........ H02P 27/04; H02P 27/085; H02P 27/08; H02P 21/00; H02P 21/0089;
(Continued)

(56) References Cited

U.S. PATENT DOCUMENTS

| 7,567,048 B2 * | 7/2009 | Shin | H02M 1/12 318/400.24 |
| 7,594,491 B2 * | 9/2009 | Yanagida | F02N 11/04 123/179.28 |

(Continued)

FOREIGN PATENT DOCUMENTS

| JP | S61-203893 A | 9/1986 |
| JP | 2000-316294 A | 11/2000 |

(Continued)

OTHER PUBLICATIONS

International Search Report of the International Searching Authority dated Nov. 18, 2014 for the corresponding international application No. PCT/JP2014/071948 (and English translation).

(Continued)

*Primary Examiner* — Paul Ip
(74) *Attorney, Agent, or Firm* — Posz Law Group, PLC

(57) ABSTRACT

An electric motor drive device including a drive controller configured to control an operation of an inverter, the drive controller including a frequency setting unit configured to set an operating frequency of an electric motor, a frequency determining unit configured to determine whether or not the operating frequency set in the frequency setting unit is equal to or lower than a set frequency threshold value, a voltage determining unit configured to determine whether or not a value of a DC voltage is equal to or larger than a set voltage threshold value, and an inverter controller configured to control the inverter based on the operating frequency set in the frequency setting unit.

10 Claims, 13 Drawing Sheets

(51) Int. Cl.
*H02P 27/08* (2006.01)
*H02P 21/14* (2016.01)

(58) Field of Classification Search
CPC ........ H02P 25/024; H02P 29/02; H02P 29/50;
H02P 6/08; H02P 6/183; H02P 6/28;
H02P 2209/01; H02P 29/026; H02P
29/40; H02P 29/62
USPC ...... 318/400.12, 400.21, 300.24, 400.3, 807;
375/326
See application file for complete search history.

(56) References Cited

U.S. PATENT DOCUMENTS

| | | | | |
|---|---|---|---|---|
| 7,928,686 B2* | 4/2011 | Saha | ..................... | B60L 11/123 180/65.285 |
| 8,077,491 B2* | 12/2011 | Yamasaki | ......... | H02M 7/53873 363/132 |
| 8,278,865 B2* | 10/2012 | Shimada | ................. | H02P 27/04 318/503 |
| 8,421,468 B2* | 4/2013 | Ono | .................... | G01R 31/3662 324/430 |
| 8,581,533 B2* | 11/2013 | Hayashi | .................. | H02P 29/02 310/315 |
| 8,853,990 B2* | 10/2014 | Takano | ................... | H02P 27/04 318/798 |
| 2007/0175429 A1* | 8/2007 | Yanagida | ................ | F02N 11/04 123/179.14 |
| 2008/0089444 A1* | 4/2008 | Shin | ........................ | H02M 1/12 375/326 |
| 2009/0115362 A1* | 5/2009 | Saha | .................... | B60L 11/123 318/400.09 |
| 2009/0184681 A1* | 7/2009 | Kuno | .................... | B60W 20/15 320/128 |
| 2011/0080131 A1* | 4/2011 | Shimada | ................. | H02P 27/04 318/503 |
| 2011/0133744 A1* | 6/2011 | Ono | .................... | G01R 31/3662 324/430 |
| 2011/0193506 A1* | 8/2011 | Hayashi | .................. | H02P 29/02 318/400.12 |
| 2012/0235604 A1* | 9/2012 | Takano | ................... | H02P 27/04 318/139 |
| 2013/0026955 A1* | 1/2013 | Kikunaga | ............. | H02P 27/085 318/51 |
| 2013/0049666 A1* | 2/2013 | Osugi | ..................... | H02P 27/08 318/503 |
| 2014/0338380 A1* | 11/2014 | Kamiya | ................... | F25B 1/10 62/129 |
| 2015/0108929 A1* | 4/2015 | Nobe | ...................... | H02P 6/085 318/400.3 |
| 2015/0130380 A1* | 5/2015 | Kato | ........................ | H02P 6/12 318/400.21 |
| 2015/0321573 A1* | 11/2015 | Sato | ...................... | H02P 27/085 701/22 |
| 2016/0280076 A1* | 9/2016 | Yaegaki | ................... | B60L 3/00 |

FOREIGN PATENT DOCUMENTS

| | | | |
|---|---|---|---|
| JP | 2002-101685 | A | 4/2002 |
| JP | 2003-148337 | A | 5/2003 |
| JP | 2008-236944 | A | 10/2008 |
| WO | 03/030348 | A1 | 4/2003 |

OTHER PUBLICATIONS

Office Action dated Sep. 26, 2017 issued in corresponding JP patent application No. 2016-543553 (and English translation).

* cited by examiner

ELECTRIC MOTOR DRIVE DEVICE AND AIR-CONDITIONING APPARATUS OR REFRIGERATING AND AIR-CONDITIONING APPARATUS USING THE SAME

CROSS REFERENCE TO RELATED APPLICATION

This application is a U.S. national stage application of PCT/JP2014/071948 filed on Aug. 22, 2014, the content of which is incorporated herein by reference.

TECHNICAL FIELD

The present invention relates to an electric motor drive device to be controlled in accordance with a load state, and to an air-conditioning apparatus or a refrigerating and air-conditioning apparatus using the same.

BACKGROUND

An air-conditioning apparatus or a refrigerating and air-conditioning apparatus includes a compressor to be driven by an electric motor, e.g., a DC brushless motor. The DC brushless motor is subjected to PWM control performed by a drive control device including a converter and an inverter. Then, a capacity of the compressor is regulated in accordance with an air-conditioning load or the like. When the air-conditioning load is high, a PWM signal is controlled such that a large output voltage is applied. In a case of a light load state, the PWM signal is controlled such that a small output voltage is applied.

Various techniques have been proposed for the drive control of the above-mentioned electric motor through pulse-width modulation (see Patent Literatures 1 to 3). In Patent Literatures 1 and 2, there is disclosed that a carrier frequency to be used for the pulse-width modulation is varied in accordance with operating conditions to enable a stable operation. In Patent Literature 3, there is disclosed that a minimum value of a voltage value to be output is fixed or a minimum value of a dead time is changed based on detection of a DC current so as to set a minimum value of ON time of an output voltage, thereby enabling a stable operation.

PATENT LITERATURE

Patent Literature 1: Japanese Unexamined Patent Application Publication No. 2000-316294
Patent Literature 2: Japanese Unexamined Patent Application Publication No. 2008-236944
Patent Literature 3: WO 2003/030348 A1

As disclosed in Patent Literatures 1 to 3, even when a method of controlling the pulse-width modulation is adjusted in accordance with a change in DC voltage or the DC current, the control of the electric motor becomes unstable in some cases. Specifically, for example, in the air-conditioning apparatus or the refrigerating and air-conditioning apparatus, control is performed so that performance and reliability can be provided optimally by specifying conditions of use such as a power supply voltage, a pressure condition, and a temperature for installation. Therefore, when the air-conditioning apparatus or the refrigerating and air-conditioning apparatus is under the light load state, a rotation speed of the compressor is not required to be increased and is controlled to be a low rotation speed. Here, when the air-conditioning apparatus or the refrigerating and air-conditioning apparatus is under the light load state and a bus voltage in the drive control device is high, a pulse width of the output voltage becomes too small. Therefore, in consideration of influence of the dead time and the like, the output voltage is not output as a square wave. Instead, an output current has a distorted waveform, resulting in unstable control of the electric motor.

SUMMARY

The present invention has been made to solve the problem described above, and has an object to provide an electric motor drive device capable of performing stable control even when an electric motor is under a light load state, and an air-conditioning apparatus or a refrigerating and air-conditioning apparatus using the same.

According to one embodiment of the present invention, there is provided an electric motor drive device configured to control drive of an electric motor, including a converter configured to convert an AC voltage supplied from an AC power supply into a DC voltage, an inverter configured to convert the DC voltage converted by the converter into an output voltage being an AC so as to apply the output voltage to the electric motor, a voltage detector configured to detect a value of the DC voltage applied to the inverter, and a drive controller configured to control an operation of the inverter, the drive controller including: a frequency setting unit configured to set an operating frequency of the electric motor, a frequency determining unit configured to determine whether or not the operating frequency set in the frequency setting unit is equal to or lower than a set frequency threshold value, a voltage determining unit configured to determine whether or not the value of the DC voltage is equal to or larger than a set voltage threshold value, and an inverter controller configured to control the inverter based on the operating frequency set in the frequency setting unit, and to control the inverter so as to suppress distortion of an output current when the frequency determining unit determines that the operating frequency is equal to or lower than the set frequency threshold value and the voltage determining unit determines that the DC voltage is equal to or larger than the set voltage threshold value.

According to one embodiment of the present invention, when the DC voltage value is equal to or larger than the set voltage threshold value and the operating frequency is equal to or lower than the set frequency threshold value, the inverter is controlled so as to suppress the distortion of the output current. As result, even when the drive is performed under a light load and the DC voltage value is high, a waveform of the current supplied to the compressor is prevented from being distorted, thereby enabling stable control.

DETAILED DESCRIPTION

Embodiment 1

Figure 1:
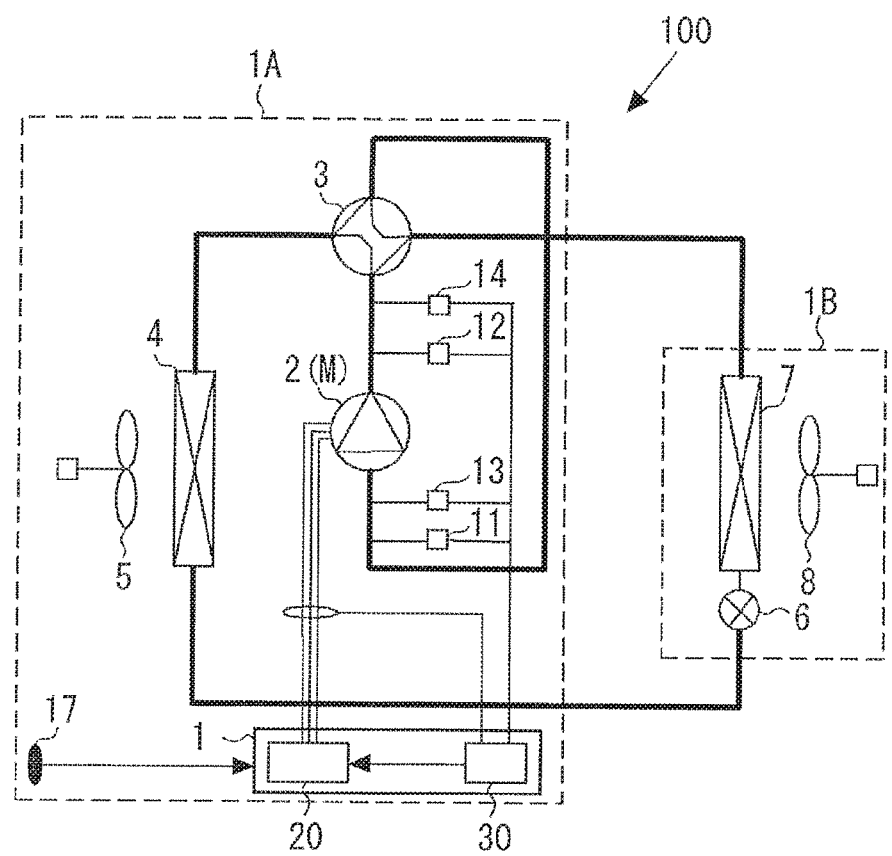
FIG. 1 is a refrigerant circuit diagram for illustrating an example of an air-conditioning apparatus or a refrigerating and air-conditioning apparatus using an electric motor drive device according to Embodiment 1 of the present invention.

A detailed description is now given of an electric motor drive device according to embodiments of the present invention with reference to the drawings. FIG. 1 is a refrigerant circuit diagram for illustrating an example of an air-conditioning apparatus or a refrigerating and air-conditioning apparatus using an electric motor drive device according to Embodiment 1 of the present invention. An electric motor drive device 1 illustrated in FIG. 1 is configured to convert electric power supplied from an AC power supply CP so as to rotationally drive a motor (load) of a compressor 2 in an air-conditioning apparatus or refrigerating and air-conditioning apparatus 100. The air-conditioning apparatus or refrigerating and air-conditioning apparatus 100 includes an outdoor unit 1A and an indoor unit 1B. The outdoor unit 1A and the indoor unit 1B form a refrigerant circuit connected by a refrigerant pipe.

On the outdoor unit 1A side, there are installed the compressor 2 configured to compress and discharge refrigerant, a flow switching device 3 configured to switch a refrigerant passage between a cooling operation and a heating operation, an outdoor heat exchanger 4 configured to allow heat exchange between the refrigerant and outdoor air, and an outdoor fan 5 configured to send air to the outdoor heat exchanger 4. Meanwhile, on the indoor unit 1B side, there are installed an expansion device 6 configured to expand the refrigerant flowing through the refrigerant circuit, an indoor unit-side heat exchanger 7 configured to allow heat exchange between the refrigerant and indoor air, and an indoor fan 8 configured to send air to the indoor unit-side heat exchanger 7. Among those devices, the compressor 2 includes an electric motor M constructed of, for example, a DC brushless motor. An operation of the electric motor M is controlled by the electric motor drive device 1.

Figure 2:
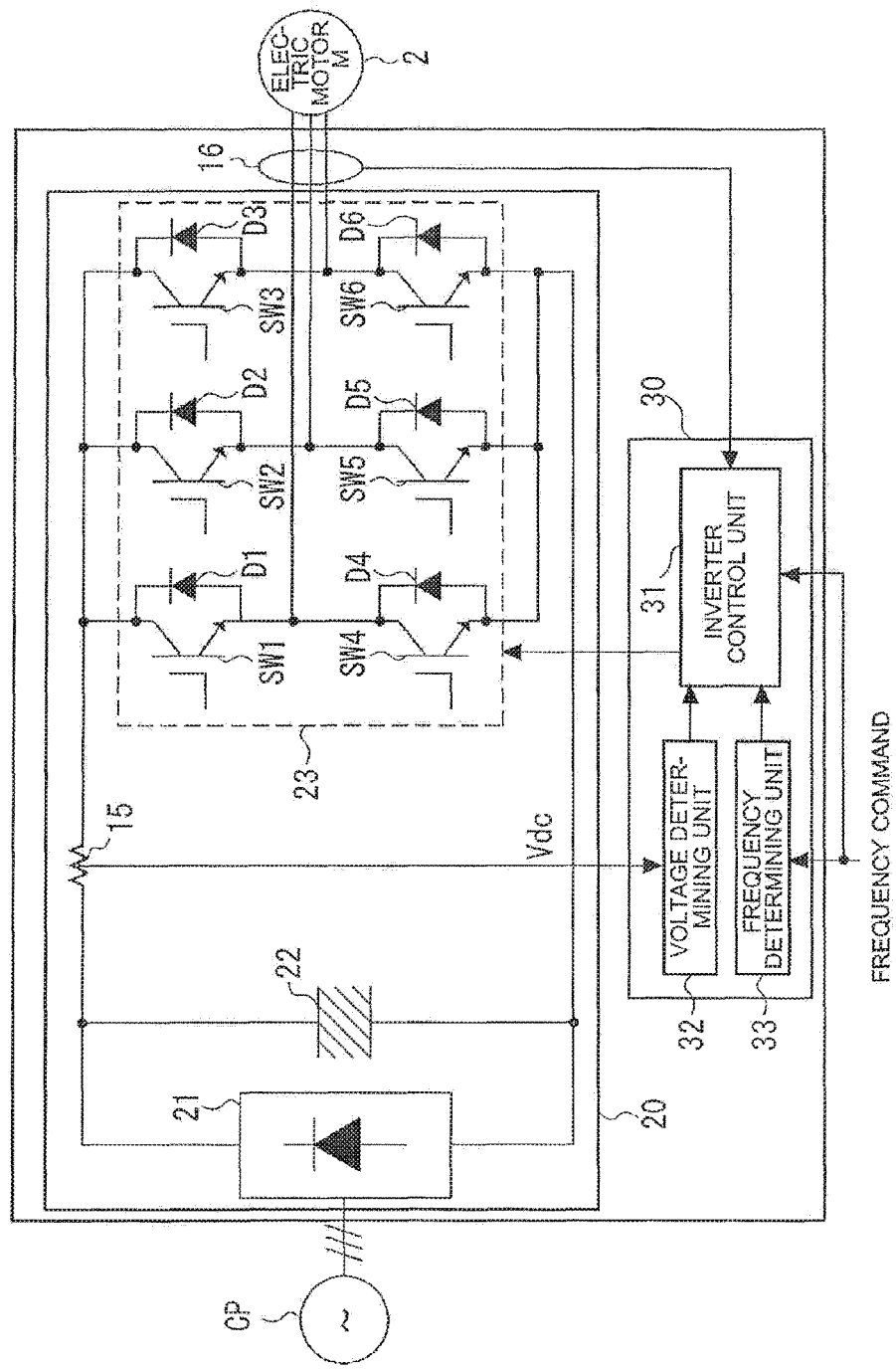
FIG. 2 is a configuration diagram for illustrating an example of the electric motor drive device according to Embodiment 1 of the present invention.

FIG. 2 is a configuration diagram for illustrating an example of the electric motor drive device according to Embodiment 1 of the present invention. Referring to FIG. 1 and FIG. 2, the electric motor drive device 1 is described. The electric motor drive device 1 is arranged, for example, on the outdoor unit 1A side, and includes a power converting unit 20 configured to convert an AC voltage supplied from a commercial power supply or other components to supply the converted voltage to the electric motor M and a drive controller 30 configured to control an operation of the power converting unit 20.

The power converting unit 20 includes a converter 21, a capacitor 22, and an inverter 23. The converter 21 is configured to convert, for example, an AC voltage (for example, AC 200 V) of the three-phase AC power supply CP, and includes, for example, a three-phase full-wave rectifier formed by bridge-connection of six diodes. The AC power supply CP is constructed of a three-phase three-wire or three-phase four-wire AC power supply (commercial power supply). The capacitor 22 is configured to smooth the DC voltage converted in the converter 21. In FIG. 2, a boost chopper circuit may be inserted between the converter 21 and the capacitor 22.

The inverter 23 is connected to the electric motor M, which is, for example, a motor of the compressor 2 of the air-conditioning apparatus or refrigerating and air-conditioning apparatus 100, and is configured to convert the DC voltage accumulated in the capacitor 22 into an output voltage Vout being an AC and supply the output voltage to the electric motor M. The inverter 23 includes a plurality of switching elements SW1 to SW6, each having, for example, an insulating gate input, and diodes D1 to D6 connected in anti-parallel to the switching elements SW1 to SW6, respectively. A power semiconductor element such as an IGBT, a thyristor, a power MOSFET, or an FWD, for example, is used for each of the above-mentioned converter 21 and inverter 23. As a material thereof, a wideband gap semiconductor element, e.g., a silicon, silicon carbide, gallium nitride, or silicon carbide (SiC) element is used. Switching operations of the switching elements SW1 to SW6 in the inverter 23 are controlled by the drive controller 30.

Next, an operation example of the power converting unit 20 is described referring to FIG. 2. First, the AC voltage is supplied from the AC power supply CP to the converter 21 so as to be rectified into the DC voltage in the converter 21. Thereafter, the rectified DC voltage is supplied to the capacitor 22. The voltage accumulated in the capacitor 22 is supplied to the inverter 23. Then, the switching elements SW1 to SW6 are subjected to switching control in the inverter 23, thereby generating the output voltage Vout, which is then supplied to the electric motor M of the compressor 2.

As described above, an operation of the inverter 23 is controlled by the drive controller 30 constructed of, for example, a microcomputer such as a DSP. At this time, the drive controller 30 is configured to control the operation of the inverter 23 based on information detected by various sensors. Specifically, the electric motor drive device 1 illustrated in FIG. 1 includes a suction pressure detector 11 configured to detect a suction pressure of the refrigerant sucked into the compressor 2, a discharge pressure detector 12 configured to detect a discharge pressure of the refrigerant discharged from the compressor 2, a suction temperature detector 13 configured to detect a temperature of the refrigerant sucked into the compressor 2, a discharge temperature detector 14 configured to detect a temperature of the refrigerant output from the compressor 2, and an outside-air temperature detector 17 configured to detect an outside-air temperature. Further, as illustrated in FIG. 2, the electric motor drive device 1 includes a voltage detector 15 configured to detect a DC voltage Vdc converted by the converter 21 (or accumulated in the capacitor 22) and a current detector 16 configured to detect a current flowing through the electric motor M of the compressor 2. The drive controller 30 is configured to perform inverter control based on information detected by the above-mentioned various sensors.

The drive controller 30 includes an inverter controller 31, a voltage determining unit 32, and a frequency determining unit 33. The inverter controller 31 is configured to set the output voltage Vout to be applied to the electric motor M. The inverter controller 31 is configured to calculate the desired output voltage Vout based on the operating frequency command input, for example, from outside and the DC voltage Vdc detected by the voltage detector 15. Then, the inverter controller 31 generates PWM signals for driving the plurality of switching elements of the inverter 23 so as to obtain the calculated output voltage Vout. The inverter controller 31 is configured to output PWM signals to an upper arm side (switching elements SW1 to SW3 side) and a lower arm side (switching elements SW4 to SW6 side), respectively, of the inverter 23.

The voltage detector 32 is configured to determine whether the DC voltage Vdc detected by the voltage detector 15 is equal to or larger than a set voltage threshold value Vref. Further, the voltage detector 32 has a function of storing a result of detection as a fixed-value setting flag FRAG. The voltage detector 32 is configured to set the fixed-value setting flag FRAG to 1 when a value of the DC voltage Vdc is equal to or larger than the set voltage threshold value Vref and set the fixed-value setting flag FRAG to 0 when the value of the DC voltage Vdc is smaller than the set voltage threshold value Vref.

The frequency determining unit 33 is configured to determine whether or not an operating frequency f set in the inverter controller 31 is equal to or lower than a set frequency threshold value fref. The frequency determining unit 33 stores the set frequency threshold value fref of, for example, 25 Hz in advance, and is configured to compare the operating frequency f and the set frequency threshold value fref with each other. In the air-conditioning apparatus or refrigerating and air-conditioning apparatus 100, the output value Vout to be applied to the compressor 2 is required to be increased as the air-conditioning load increases. In order to increase the output voltage Vout, the operating frequency f is required to be increased. In other words, a state in which the operating frequency f is equal to or lower than the set frequency threshold value fref means a state in which the air-conditioning load is low.

When the bus voltage is high under the light load state, the pulse width of the output voltage becomes too small. Therefore, in consideration of influence of dead time or other factors, the output voltage Vout is not output as a square wave. Thus, an output current has a distorted waveform, resulting in unstable control of the motor. Therefore, the voltage determining unit 32 and the frequency determining unit 33 are configured to determine whether or not the air-conditioning apparatus or refrigerating and air-conditioning apparatus 100 is under the light load state and the current voltage Vdc (bus voltage) is in a high state. When the DC voltage Vdc is in a high state under the light load state, the inverter controller 31 controls the inverter 23 so as to suppress the distortion of the output voltage Vout.

More specifically, when it is determined by the voltage determining unit 32 that the DC voltage Vdc is equal to or larger than the set voltage threshold value Vref and it is determined by the frequency determining unit 33 that the operating frequency f is equal to or lower than the set frequency threshold value fref, the inverter controller 31 sets a preset fixed output voltage Vfix as the output voltage Vout. In other words, even when the operating frequency f is low, the output voltage Vout is prevented from being set lower than the fixed output voltage Vfix.

Meanwhile, when it is determined that the operating frequency f is higher than the set frequency threshold value fref or it is determined that the DC voltage Vdc is smaller than the set voltage threshold value Vref, the inverter controller 31 outputs the PWM signal through vector control. The vector control means that the current flowing through the motor is split into a current serving as a torque (torque component current) and a current for generating a magnetic field in a rotator (exciting current) such that a direction of a motor current is subjected to a vector computation, to thereby be controlled.

Figure 3:
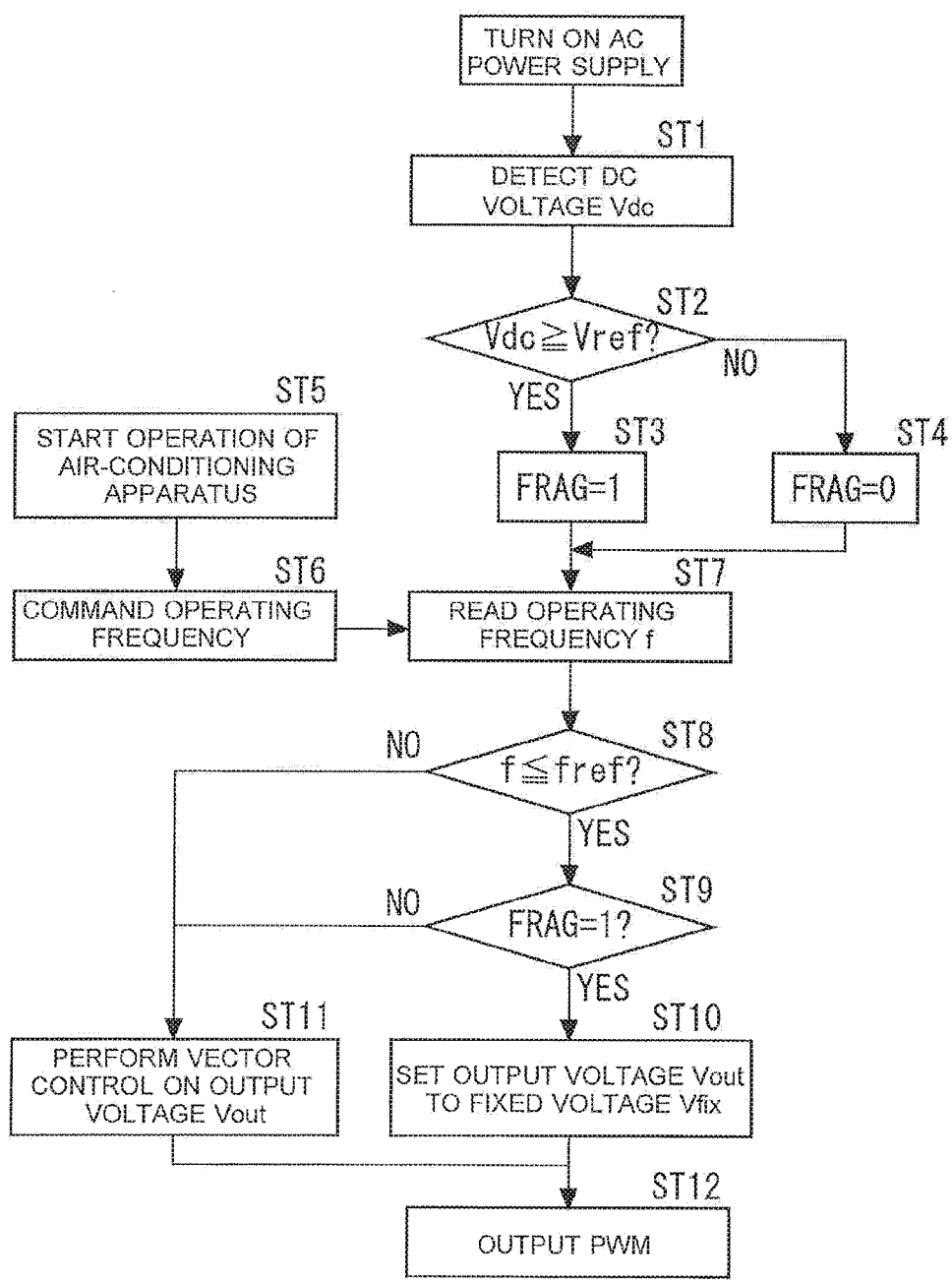
FIG. 3 is a flowchart for illustrating an operation example of the electric motor drive device illustrated in FIG. 1 and FIG. 2.

FIG. 3 is a flowchart for illustrating an operation example of the electric motor drive device illustrated in FIG. 1 and FIG. 2. Referring to FIG. 1 to FIG. 3, the operation example of the electric motor drive device 1 is described. First, when the AC power is supplied from the AC power supply CP to the power converting unit 20 of the electric motor drive device 1, the AC power is converted into a DC in the converter 21 and is then smoothed in the capacitor 22. At this time, the DC voltage Vdc is detected in the voltage detector 15 (Step ST1). Next, it is determined in the voltage determining unit 32 whether or not the DC voltage Vdc is equal to or larger than the set voltage threshold value Vref (Step ST2). When a value of the DC voltage Vdc is equal to or larger than the set voltage threshold value Vref, the fixed-value setting flag FRAG is set to "1" (Step ST3). Meanwhile, when the value of the DC voltage Vdc is smaller than the set voltage threshold value Vref, the fixed-value setting flag FRAG is set to "0" (Step ST4).

Thereafter, after the operation of the air-conditioning apparatus or refrigerating and air-conditioning apparatus 100 is started (Step ST5), an operating frequency command is transmitted from an operation setting device (not shown), e.g., the indoor unit 1B in the air-conditioning apparatus or refrigerating and air-conditioning apparatus 100, to the inverter controller 31 (Step ST6) such that the operating frequency f is read in the inverter controller 31 (Step ST7). When the operating frequency f is equal to or lower than the set frequency threshold value fref (YES in Step ST8) and the fixed-value setting flag FRAG is "1" (YES in Step ST9) at the same time, the output voltage Vout is set to the fixed output voltage Vfix in the inverter controller 31 (Step ST10). Meanwhile, when the fixed-value setting flag FRAG is "0" (NO in Step ST9) or the operating frequency f is higher than the set frequency threshold value fref (NO in Step ST8), the output voltage Vout is set in the inverter controller 31 by using the vector control. Then, the PWM signals are output from the inverter control 31 to the inverter 23 such that the set output voltage Vout is obtained (Step ST 12).

As a specific example, it is assumed that the set voltage threshold value Vref of the DC voltage Vdc is 680 V, the set frequency threshold value fref of the operating frequency f is 25 Hz, the fixed output voltage (minimum fixed value) Vfix is 60 V, and the AC power supply supplies AC power at 400 Vrms or 575 Vrms. In this case, the DC voltage Vdc is $2^{1/2}$ times as large as the AC voltage. Therefore, when the AC power supply is 400 Vrms, the DC voltage Vdc is 400 Vrms×$2^{1/2}$=565 V. Further, when the AC power supply is 575 Vrms, the DC voltage Vdc is 575 Vrms×$2^{1/2}$=813 V.

When the AC power supply is 575 Vrms, 813 V (DC voltage Vdc)>680 V (set voltage threshold value Vref) is established (Step ST2). Therefore, the fixed-value setting flag FRAG becomes "1" (Step ST3). Further, when the AC power supply is 575 V under the light load state in which, for example, a temperature of the outdoor unit is equal to or lower than 0 degrees Celsius and the number of operating indoor units is one, the operating frequency f becomes low, for example, 15 Hz. Then, it is determined in the frequency determining unit 33 that 15 Hz (operating frequency f)<25 Hz (set frequency threshold value fref) (Step ST8). The fixed-value setting frag FRAG is "1" (YES in Step ST9), and therefore the output voltage Vout is set to the fixed output voltage Vfix (Step ST10). Specifically, the minimum value of the output voltage Vout is 60 V. Therefore, when output setting is such that the output voltage becomes lower than 60 V, the operation is performed after a power factor is lowered so as to perform control to prevent the output from becoming lower than 60 V. As described above, when the AC power supply is increased to 575 Vrms, instability in control is eliminated to enable the operation under the light load state.

Meanwhile, in the case where the AC power supply is 400 Vrms, 565 V (DC voltage Vdc)<680 V (set voltage threshold value Vref) is established (Step ST2). Therefore, the PWM signals are output through the vector control without performing the fixed-voltage control on the output voltage (Step ST11). Thus, the PWM output is performed through the vector control, thereby performing optimal operation control. In the manner described above, an efficient operation is performed over the entire operation range.

According to Embodiment 1, when the drive is performed at the high DC voltage Vdc under the light load state in which the operating frequency f is equal to or lower than the set frequency threshold value fref, the inverter control is performed so as to output the fixed output voltage Vfix as the output voltage Vout to prevent the occurrence of distortion in the output voltage Vout. As a result, an efficient operation can be performed. Thereafter, when the operating frequency f becomes higher than the set frequency threshold value fref, the inverter controller 31 starts performing the vector control to perform the PWM output. As a result, efficient operation control can be performed.

Specifically, when the DC voltage Vdc is high under the light load state, the distortion of the output voltage Vout becomes relatively large. As a result, the control of the electric motor M becomes unstable. Here, the light load state occurs when the operating frequency f is low. Therefore, by determining whether or not the operating frequency f is higher than the set frequency threshold value fref, it is determined whether or not the light load state has occurred. For example, when an operation command is for operating a small number of indoor units, the outdoor unit transmits a low operating frequency to the controller side as a command value. Therefore, the operating frequency f becomes low. Further, even under the light load state, when the output voltage Vout is set to the fixed output voltage Vfix when the power supply voltage is low, the power factor degrades.

Therefore, efficiency of the DC brushless motor is degraded to cause a motor failure due to heat generation of the motor. Therefore, when the DC voltage Vdc is equal to or larger than the set voltage threshold value Vref and the operating frequency f is equal to or lower than the set frequency threshold value fref, the inverter controller 31 sets the output voltage Vout to the fixed output voltage Vfix. Then, the occurrence of distortion in the output current can be prevented so that the compressor 2 can perform an efficient operation.

Figure 4:
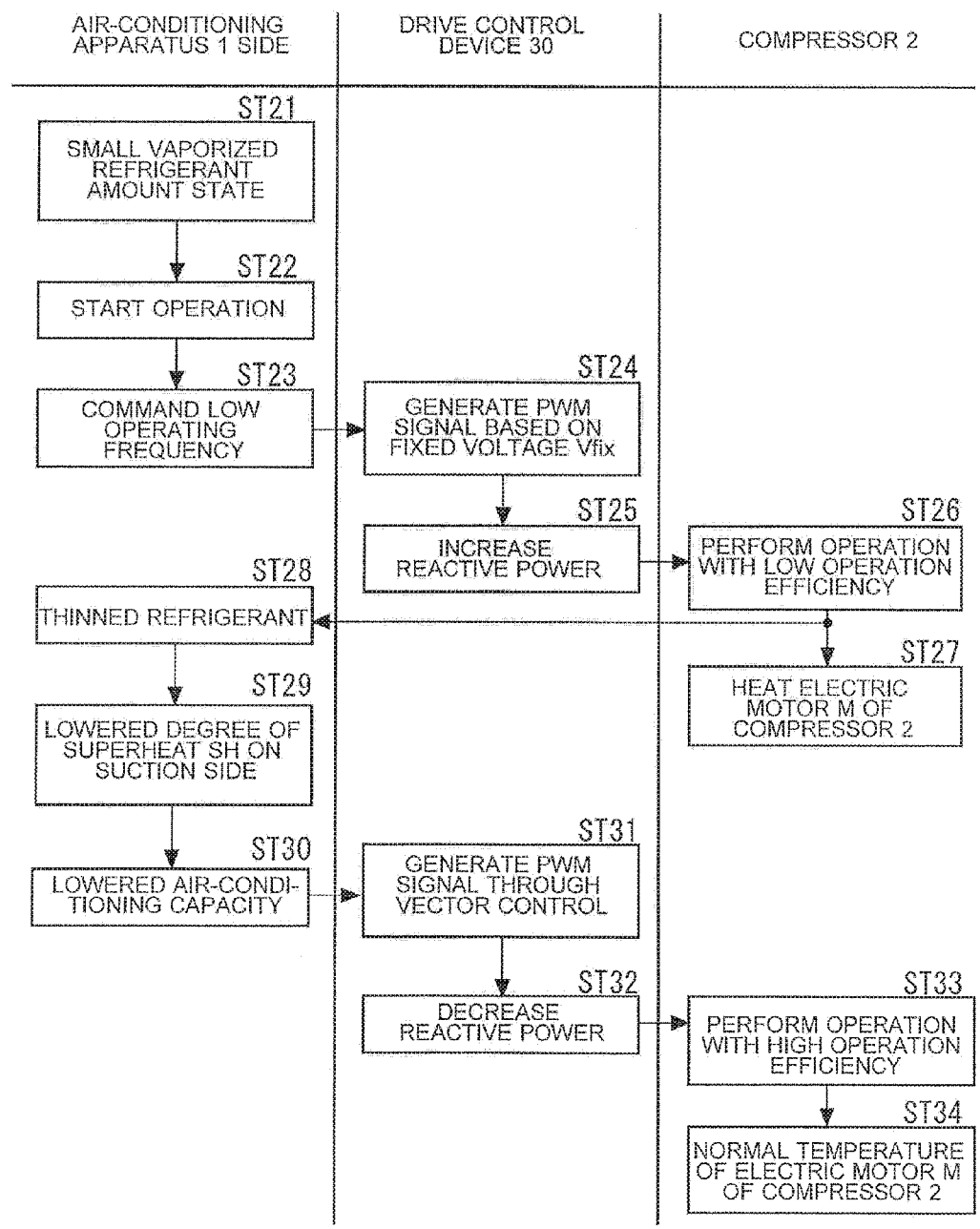
FIG. 4 is a flowchart for illustrating an example of a shift from setting of a fixed output voltage to vector control.

FIG. 4 is a flowchart for illustrating an example of a shift from setting of the fixed output voltage to the vector control. As illustrated in FIG. 4, a vaporized refrigerant amount in a pipe is in a small state at time of activation (Step ST21). When the operation is started in this state (Step ST22), the low operating frequency f is commanded (Step ST23) to generate the PWM signals based on the fixed output voltage Vfix (Step ST24). When the output voltage Vout is the fixed output voltage Vfix, reactive power increases because of the low power factor (Step ST25). The compressor 2 performs an operation with low efficiency (Step ST26). As a result, the temperature of the motor inside the compressor 2 is increased due to the reactive power (Step ST27).

Thereafter, the refrigerant inside the pipe is thinned due to the operation of the compressor 2 (Step ST28) to decrease a degree of superheat SH on the suction side of the compressor 2 (Step ST29). Then, air-conditioning capacity of the air-conditioning apparatus or refrigerating and air-conditioning apparatus 100 is lowered (Step ST30). Therefore, the operating frequency f is gradually increased from a lowest operating frequency, for example, 15 Hz so as to enhance the air-conditioning capacity. Then, when the operating frequency f becomes higher than the set frequency threshold value fref, the vector control is started (Step ST31). As a result, the power factor is improved to decrease the reactive power (Step ST32). Then, the efficiency of the compressor is improved (Step ST33). As a result, the temperature of the motor becomes an optimal temperature (Step ST34).

Embodiment 2

Figure 5:
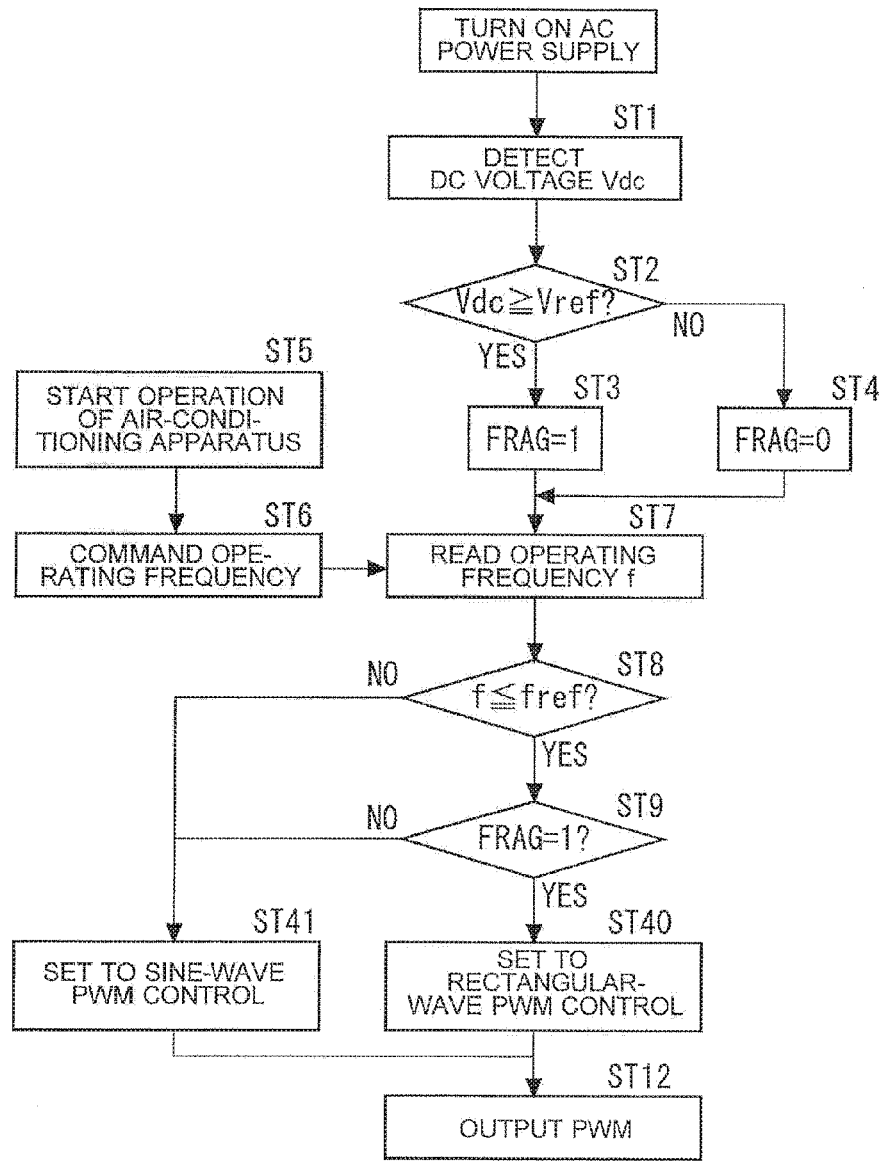
FIG. 5 is a flowchart for illustrating an operation example of a drive controller of an air-conditioning apparatus or a refrigerating and air-conditioning apparatus according to Embodiment 2 of the present invention.

FIG. 5 is a flowchart for illustrating an operation example of a drive controller of an air-conditioning apparatus or refrigerating and air-conditioning apparatus according to Embodiment 2 of the present invention. Referring to FIG. 5, an operation example of the drive control in Embodiment 2 is described. In the operation example of the drive controller illustrated in FIG. 5, portions having the same configurations or steps as those of FIG. 1 to FIG. 4 are denoted by the same reference symbols, and description thereof is herein omitted. Embodiment 2 illustrated in FIG. 5 differs from Embodiment 1 illustrated in FIG. 4 in that switching is performed between a sine-wave PWM method and a rectangular-wave PWM method in accordance with the DC voltage Vdc and the operating frequency f.

In FIG. 5, when the operating frequency f is equal to or lower than the set frequency threshold value fref and the DC voltage Vdc is equal to or larger than the set voltage threshold value Vref (set-value setting flag FRAG=1), the inverter controller 31 performs control by using the rectangular-wave PWM control to generate the PWM signals (Step ST40). Meanwhile, when the operating frequency f is higher than the set frequency threshold value fref or when the fixed-voltage setting flag FRAG=0, the inverter controller 31 performs control by using the sine-wave PWM control to generate the PWM signals (Step ST41).

Figure 6A:
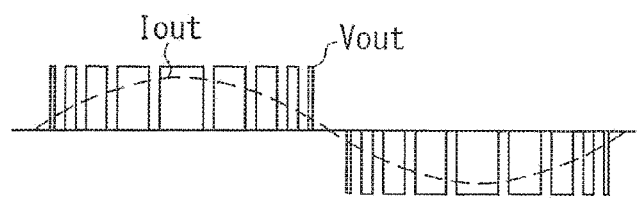
FIG. 6A is a graph for showing an example of an output voltage and a PWM signal output at time of sine-wave PWM control.

FIG. 6A is a graph for showing an example of the output voltage and the PWM signal output at the time of the sine-wave PWM control. As shown in FIG. 6A, with the sine-wave PWM control method, ON time of the PWM signal is changed to perform control such that the output voltage Vout applied to the motor M becomes a sine wave. As a result, the output current has a waveform close to a sine-wave output. Therefore, noise, vibration, efficiency, and characteristics of the motor, e.g., a torque pulsation become better than those obtained with the rectangular-wave PWM control. In the case of the air-conditioning apparatus or refrigerating and air-conditioning apparatus 100, the PWM signal is output generally using the sine-wave PWM control so as to reduce influence of, for example, the noise and the vibration of the motor. In this manner, the occurrence of distortion in the output voltage Vout can be prevented so as to minimize the influence of noise and vibration. At the same time, the voltage ON time is fixed, and hence instability of the control can be eliminated.

Figure 6B:
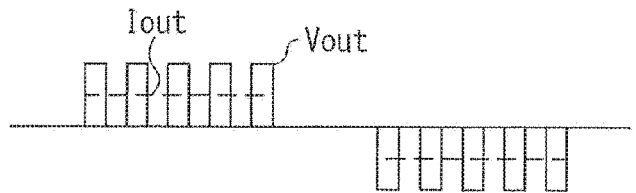
FIG. 6B is a graph for showing an example of an output voltage and a PWM signal output at time of rectangular-wave PWM control.

FIG. 6B is a graph for showing an example of the output voltage and the PWM signal output at the time of the rectangular-wave PWM control. At the time of the rectangular-wave PWM control, the output voltage Vout having a square wave with the fixed ON time is applied to the electric motor M of the compressor 2. In this case, the ON time is fixed. Therefore, the occurrence of the distortion in the output current can be prevented. As the operating frequency f increases or as the drive is continued in an overload state, the vibration and the noise of the electric motor M increase. However, when the DC voltage Vdc is smaller than the set voltage threshold value Vref or the operating frequency f becomes higher than the set frequency threshold value fref, the sine-wave PWM control is performed as described above. In this manner, when a high load state occurs, efficient PWM control can be performed.

According to Embodiment 2 described above, when the DC voltage Vdc is high and drive is performed in the light load state in which the operating frequency f is equal to or lower than the set frequency threshold value fref, the inverter control is performed by using the rectangular-wave PWM control so as to prevent the occurrence of distortion in the output current. As a result, an efficient operation can be performed. Thereafter, when the operating frequency f becomes higher than the set frequency threshold value fref, the inverter controller 31 shifts to the sine-wave PWM control to perform the PWM output. As a result, efficient operation control can be performed.

Embodiment 3

Figure 7:
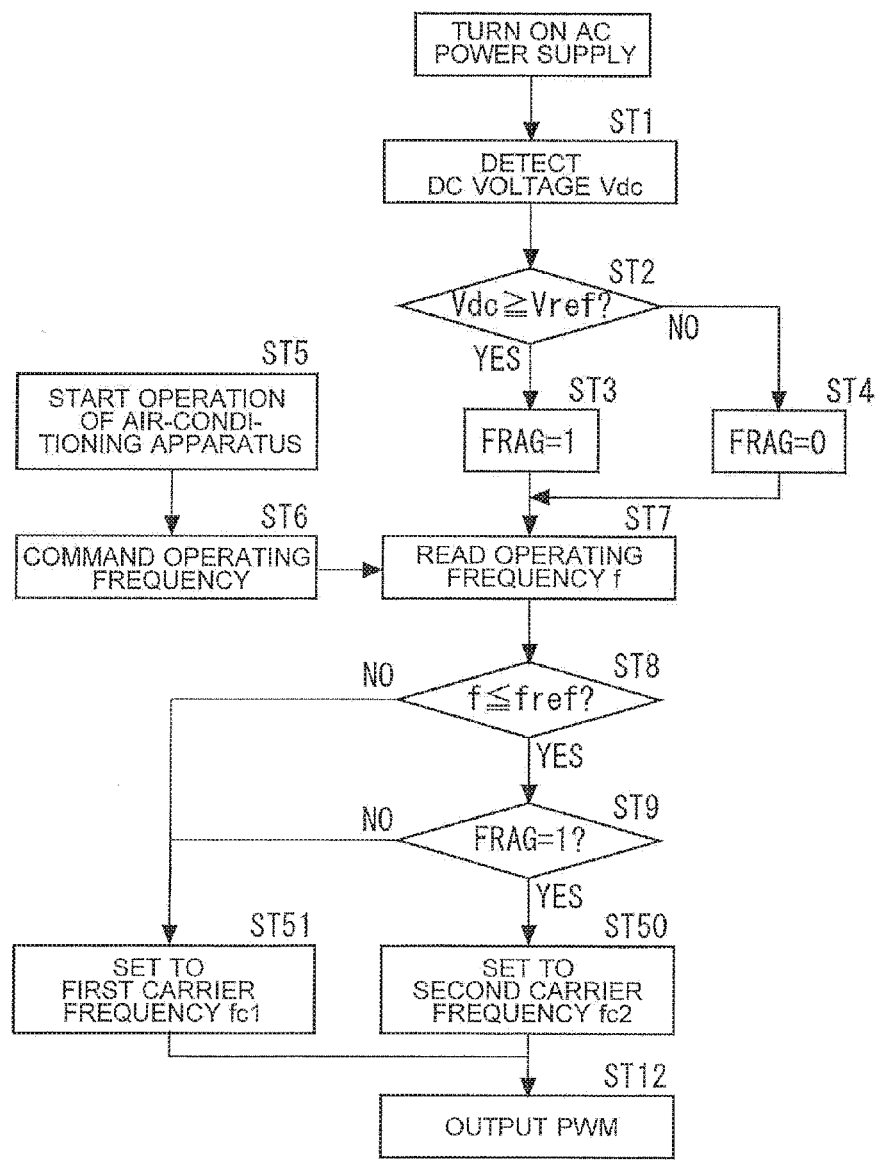
FIG. 7 is a flowchart for illustrating an operation example of a drive controller of an air-conditioning apparatus or a refrigerating and air-conditioning apparatus according to Embodiment 3 of the present invention.

FIG. 7 is a flowchart for illustrating an operation example of a drive controller of an air-conditioning apparatus or refrigerating and air-conditioning apparatus according to Embodiment 3 of the present invention. Referring to FIG. 7, an operation example of the drive control in Embodiment 3 is described. In the operation example of the drive controller illustrated in FIG. 7, portions having the same configurations or steps as those of FIG. 1 to FIG. 4 are denoted by the same reference symbols, and description thereof is herein omitted. Embodiment 3 illustrated in FIG. 7 differs from Embodiment 1 illustrated in FIG. 1 to FIG. 4 in that control for switching a carrier frequency of the output voltage Vout applied to the electric motor M of the compressor 2 is performed.

In FIG. 7, when the operating frequency f is equal to or lower than the set frequency threshold value fref and the DC voltage Vdc is equal to or larger than the set voltage threshold value Vref (set-value setting flag FRAG=1), the inverter controller 31 performs control by using the second carrier frequency fc2 to generate the PWM signals (Step ST50). Meanwhile, when the operating frequency f is higher than the set frequency threshold value fref or when the fixed-voltage setting flag FRAG=0, the inverter controller 31 performs control by using the first carrier frequency fc1 to generate the PWM signals (Step ST51).

In the inverter controller 31, the first carrier frequency fc1 and the second carrier frequency fc2, which are two different carrier frequencies, are preset. In accordance with a result of determination, any one of the first carrier frequency fc1 and the second carrier frequency fc2 is set to generate the PWM signal. Among those frequencies, the first carrier frequency fc1 is set higher than the second carrier frequency fc2. In particular, when the second carrier frequency fc2 is used, such a PWM signal that the voltage ON time is fixed is generated.

Figure 8:
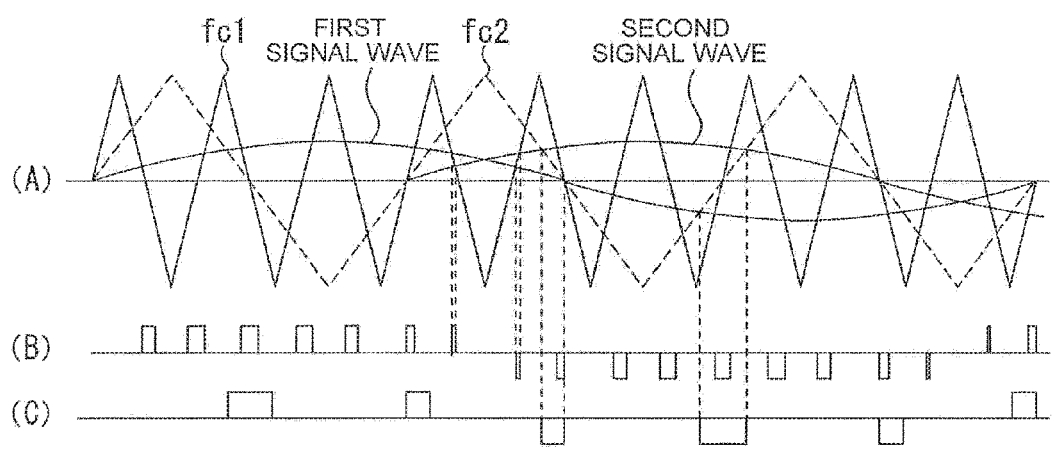
FIG. 8 is a graph for showing a relationship between signal waves of different phases, a first carrier frequency, a second carrier frequency, and a line voltage in FIG. 7.

FIG. 8 is a graph for showing a relationship between signal waves of different phases, the first carrier frequency, the second carrier frequency, and a line voltage in FIG. 7. Part (A) of FIG. 8 is part for showing a relationship between a first signal wave, a second signal wave, the first carrier frequency, and the second carrier frequency. Part (B) of FIG. 8 is a graph for showing an example of the PWM signal generated by using the first carrier frequency. Part (C) of FIG. 8 is a graph for showing an example of the PWM signal generated by using the second carrier frequency. As shown in part (B) of FIG. 8, when the first carrier frequency fc1 is used, there exists a region in which the output voltage Vout having short ON time and a narrow pulse width is generated in the line voltage between the first signal wave and the second signal wave. Meanwhile, as shown in part (C) of FIG. 8, when the second carrier frequency fc2 is used, the output voltage Vout with a narrow pulse width is not generated in the line voltage between the first signal wave and the second signal wave, and therefore the pulse width of the output voltage Vout becomes large. As a result, instability in the control due to the distortion of the output current can be eliminated.

Meanwhile, when the second carrier frequency fc2 is used, a width of the ON time and a width of OFF time of the line voltage increases. Therefore, the distortion of the sine wave of the output current flowing to the electric motor M increases. Due to the distortion, vibration and noise applied to the electric motor M increase. Then, when the second carrier frequency fc2 is continuously used, as the operating frequency f becomes higher, specifically, as the drive in the overload state is continued, the vibration and the noise of the motor increase. Therefore, only when the DC voltage Vdc is high and the operating frequency f is low, the second carrier frequency fc2 is used. In this manner, the influence of the noise and the vibration can be kept small. In addition, the voltage ON time is fixed, and therefore the instability in the control can be eliminated.

Embodiment 4

Figure 9:
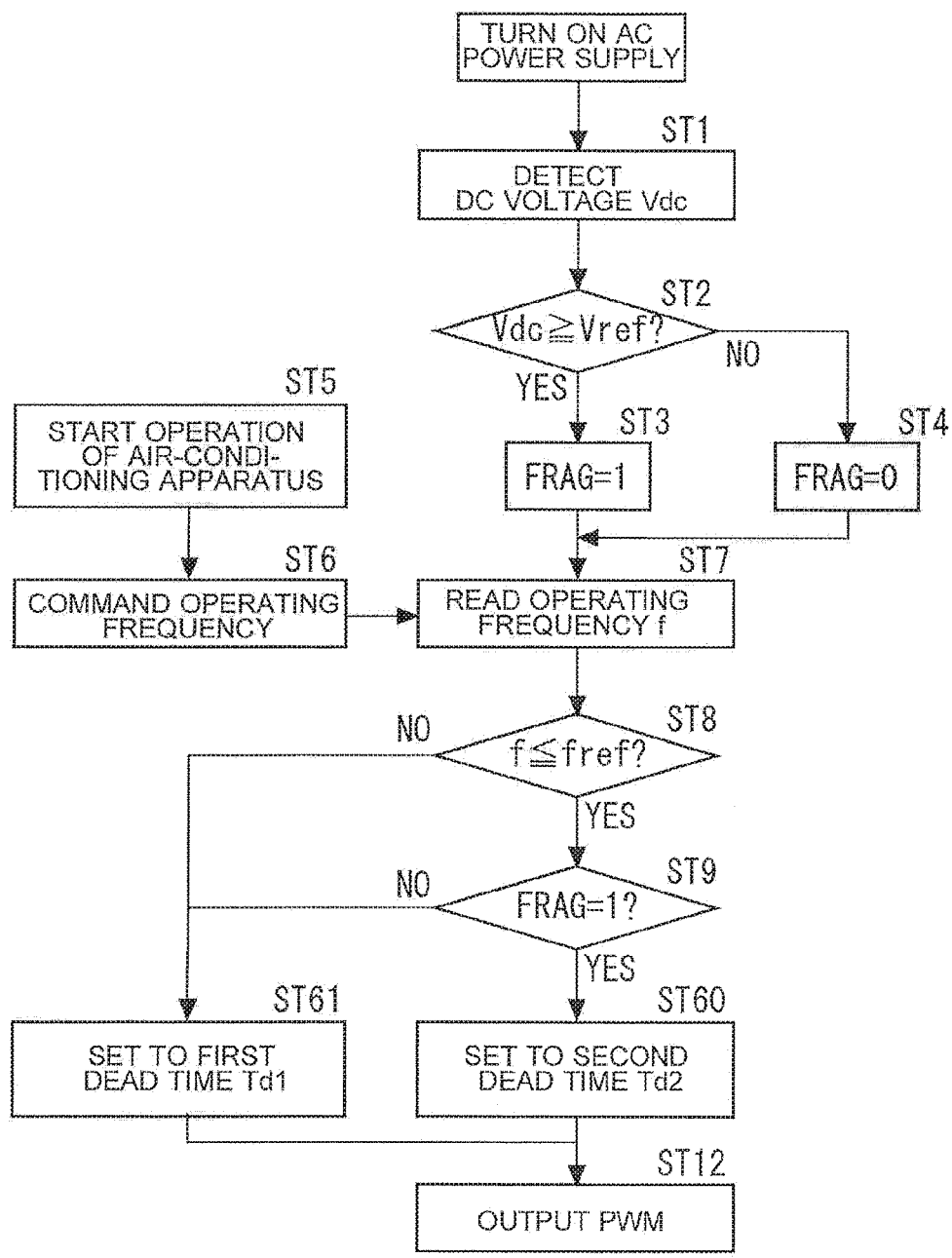
FIG. 9 is a flowchart for illustrating an operation example of a drive controller of an air-conditioning apparatus or a refrigerating and air-conditioning apparatus according to Embodiment 4 of the present invention.

FIG. 9 is a flowchart for illustrating an operation example of a drive controller of an air-conditioning apparatus or refrigerating and air-conditioning apparatus according to Embodiment 4 of the present invention. Referring to FIG. 9, an operation example of the drive control in Embodiment 4 is described. In the operation example of the drive controller illustrated in FIG. 9, portions having the same configurations or steps as those of FIG. 1 to FIG. 4 are denoted by the same reference symbols, and description thereof is herein omitted.

Embodiment 4 illustrated in FIG. 9 differs from Embodiment 1 illustrated in FIG. 1 to FIG. 4 in that a dead time Td of the output voltage Vout applied to the electric motor M is varied.

As illustrated in FIG. 9, when the operating frequency f is equal to or lower than the set frequency threshold value fref and the fixed-voltage setting flag FRAG=1, the PWM signal is generated by using a second dead time Td2 (Step ST60). Meanwhile, when the operating frequency f is higher than the set frequency threshold value fref or the DC voltage Vdc is smaller than the set voltage threshold value Vref, the PWM signal is generated by using a first dead time Td1 (Step ST61).

In the inverter controller 31, the first dead time Td1 and the second dead time Td2 are stored in a switchable manner. In accordance with a result of determination, any one of the first dead time Td1 and the second dead time Td2 is selected. The PWM signal is used by using the selected one of the first dead time Td1 and the second dead time Td2. Among those times, the second dead time Td2 is set to a shorter time than the first dead time Td1.

Figure 10:
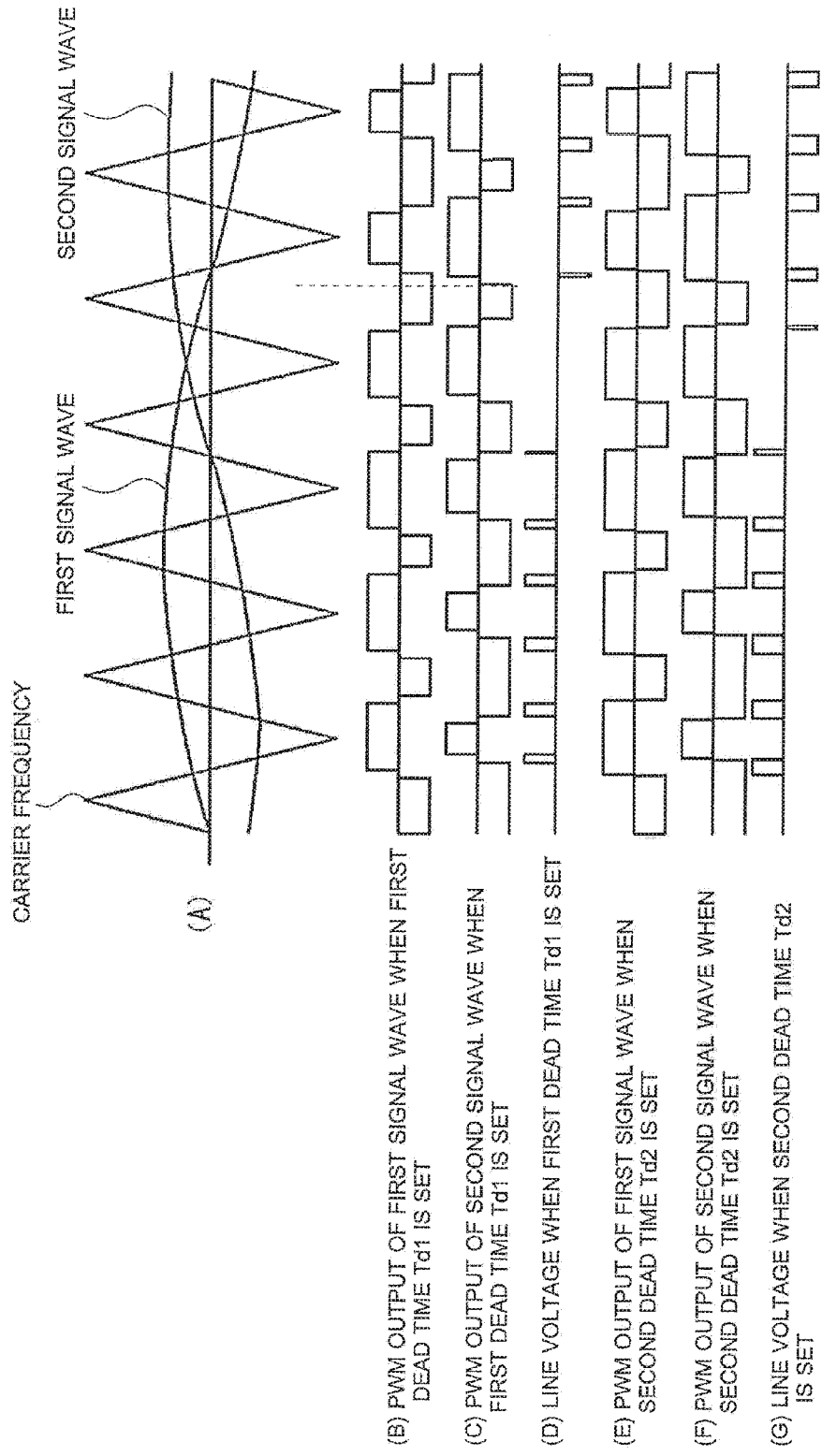
FIG. 10 is a graph for showing an example of PWM outputs of the signal waves and a line voltage when a first dead time and a second dead time in FIG. 9 are set.

FIG. 10 is a graph for showing an example of the PWM outputs of the signal waves and the line voltage when the first dead time or the second dead time illustrated in FIG. 9 is set. Part (A) of FIG. 10 is a graph for showing a relationship between the first signal wave and the second signal wave, and a carrier frequency. Part (B) of FIG. 10 is a graph for showing an example of the PWM signal of the first signal wave when the first dead time Td1 is used. Part (C) of FIG. 10 is a graph for showing an example of the PWM signal of the second signal wave when the second dead time Td2 is used. Part (D) of FIG. 10 is a graph for showing an example of the line voltage when the first dead time Td1 is used. Part (E) of FIG. 10 is a graph for showing an example of the PWM signal of the first signal wave when the second dead time Td2 is used. Part (F) of FIG. 10 is a graph for showing an example of the PWM signal of the second signal wave when the second dead time Td2 is used. Part (G) of FIG. 10 is a graph for showing the line voltage when the second dead time Td2 is used.

As shown in FIG. 10, the first dead time Td1 is longer than the second dead time Td2. Therefore, when the second dead time Td2 is used, the ON time of the line voltage output to the electric motor M becomes longer as compared with a case where the first dead time Td1 is used. Therefore, by using the second dead time Td2, stable control of the output voltage Vout is enabled.

Meanwhile, when the second dead time Td2 is used, a possibility of short-circuit of the power semiconductor elements used for the inverter 23 becomes high. For example, the inverter 23 includes the six power semiconductor elements of an upper arm and a lower arm in three-phase motor outputs (see FIG. 2). In a short-circuit state in which the upper arm and the lower arm are simultaneously turned ON, a current does not flow through the electric motor M. However, a large current flows between the upper arm and the lower arm. As a result, heat is generated due to parasitic resistances of the power semiconductor elements and the large current to cause a thermal failure. Further, the power semiconductor element requires a given time to react after reception of the PWM signal. The ON time required for the switching elements SW1 to SW6 to achieve an ON state is shorter than the OFF time required to achieve an OFF state. Therefore, when a set time of the dead time Td is too short, the power semiconductor elements of one of the upper arm and the lower arm are undesirably turned ON before the power semiconductor elements of an opposite side of the upper arm and the lower arm are turned OFF. Thus, ON timings occur simultaneously to cause short-circuit. Therefore, the dead time Td is generally designed to be optimal.

Here, the light load state of the air-conditioning apparatus or refrigerating and air-conditioning apparatus 100 corresponds to a state in which the amount of vaporized refrigerant is small. The refrigerant is liquefied when an outdoor temperature is low (for example, 0 degrees Celsius or lower). Therefore, the amount of vaporized refrigerant is relatively reduced. When the outdoor temperature is low, the temperature of the electric motor drive device 1 mounted in the outdoor unit 1A also becomes low. In general, for the power semiconductor elements, the ON time increases and the OFF time decreases as the temperature decreases. For example, the ON time is 151 ns and the OFF time is 950 nm at 125 degrees Celsius, whereas the ON time is 158 ns and the OFF time is 850 ns at 25 degrees Celsius. Therefore, in the case of the air-conditioning apparatus or refrigerating and air-conditioning apparatus, the set value of the Td time can be optimized to a value smaller than a general value under the light load (at the low temperature).

According to Embodiment 4, in the light load state, the PWM signal is generated after the second dead time Td2 is set. As a result, based on the fact that the ON time increases and the OFF time decreases in the light load state, the occurrence of distortion in the output voltage Vout is prevented while the short-circuit between the upper arm and the lower arm in the inverter 23 is prevented, thereby enabling an efficient operation.

Embodiment 5

Figure 11:
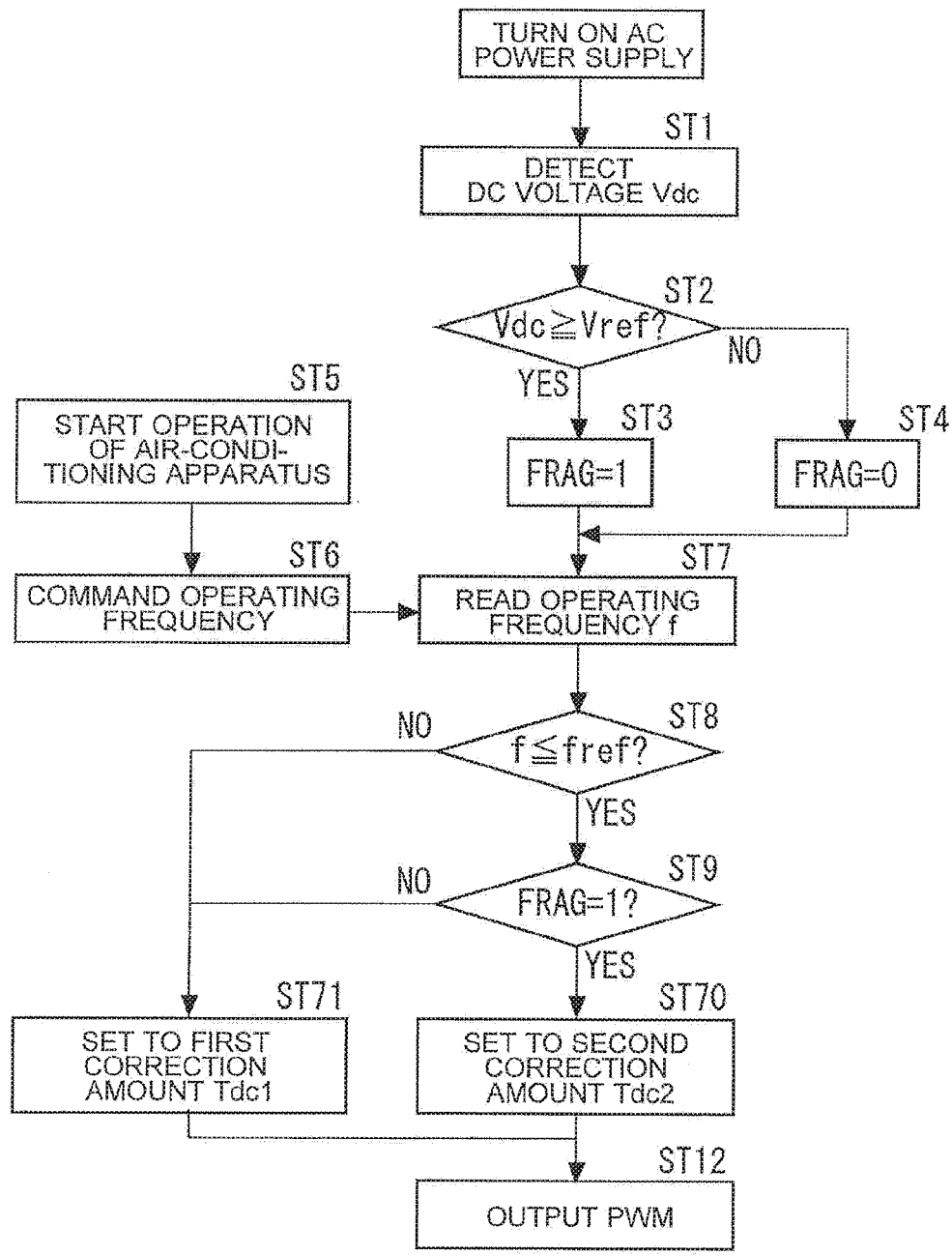
FIG. 11 is a flowchart for illustrating an operation example of a drive controller of an air-conditioning apparatus or a refrigerating and air-conditioning apparatus according to Embodiment 5 of the present invention.

FIG. 11 is a flowchart for illustrating an operation example of a drive controller of an air-conditioning apparatus or refrigerating and air-conditioning apparatus according to Embodiment 5 of the present invention. Referring to FIG. 11, an operation example of the drive control in Embodiment 5 is described. In the operation example of the drive controller illustrated in FIG. 11, portions having the same configurations or steps as those of FIG. 1 to FIG. 4 are denoted by the same reference symbols, and description thereof is herein omitted. Embodiment 5 illustrated in FIG. 11 differs from Embodiment 1 illustrated in FIG. 1 to FIG. 4 in that the output voltage Vout applied to the electric motor M is varied in response to the dead time Td.

Correction of the output voltage Vout in response to the dead time Td means providing a command value with correction of the output voltage Vout in view of the OFF time corresponding to the dead time Td because the ON time of the line voltage decreases under the influence of the dead time Td to result in the actual output value Vout lower than a voltage desired to be output. In the inverter controller 31, a first correction amount Vd1 and a second correction amount Vd2 for correcting the output voltage Vout in response to the dead time Td are stored. The second correction amount Vd2 has a larger value than the first correction amount Vd1. For example, the first correction amount Vd1 is set to 3 microseconds, whereas the second correction amount Vd2 is set to 5 microseconds. Then, the inverter controller 31 sets any one of the first correction amount Vd1 and the second correction amount Vd2 to be used to generate the PWM signal in accordance with a result of determination, and corrects the output voltage Vout based on the set first correction amount Vd1 or second correction amount Vd2 to generate the PWM signal.

When the operating frequency f is equal to or lower than the set frequency threshold value fref and when the fixed-value setting flag FRAG=1, the output voltage Vout is corrected with the second correction amount Vd2. The PWM signal is generated by using the corrected output voltage Vout, and is output to the inverter 23 (Step ST70). Meanwhile, when the operating frequency f is higher than the set frequency threshold value fref and the fixed-value setting flag FRAG=0, the output voltage Vout is corrected with the first correction amount Vd1. The PWM signal is generated by using the corrected output voltage Vout, and is output to the inverter 23 (Step ST71).

Figure 12:
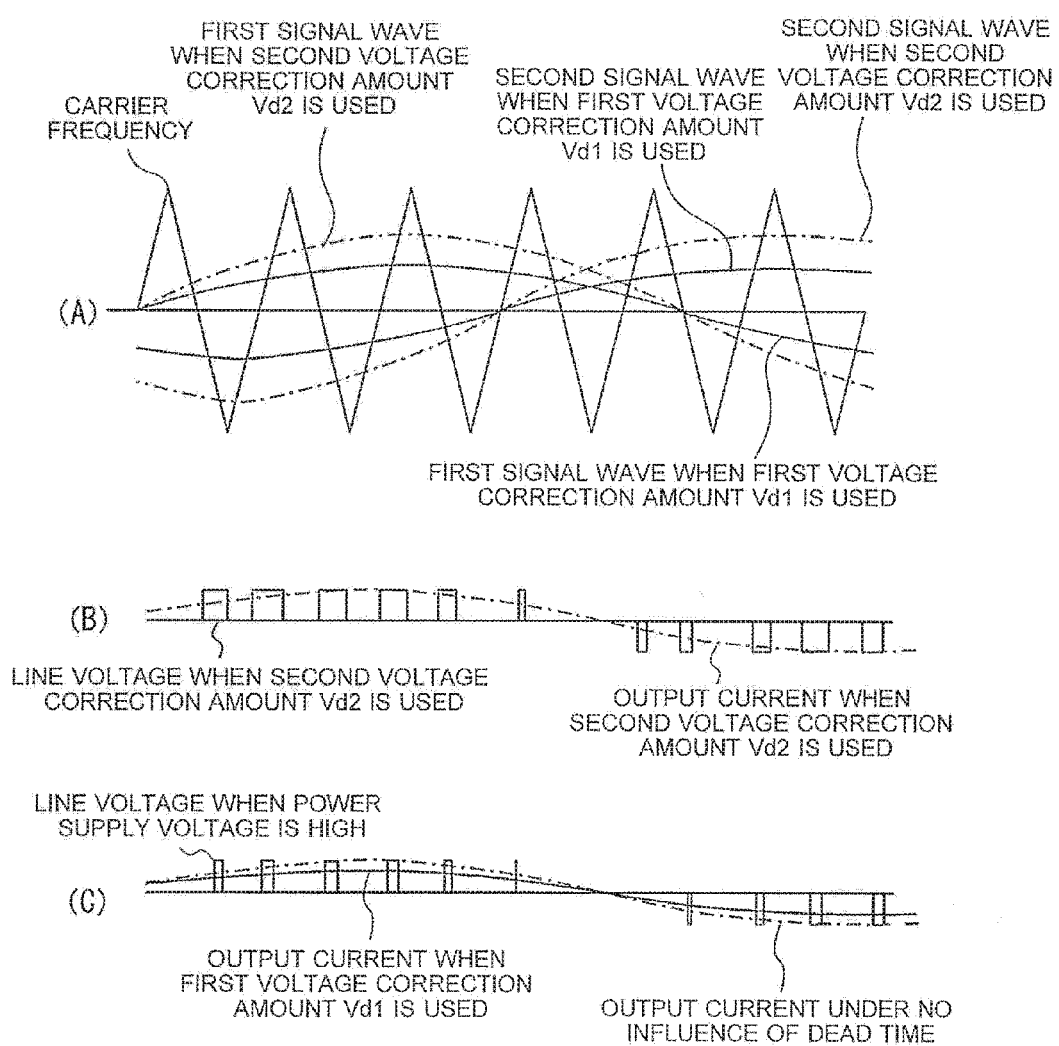
FIG. 12 is a graph for showing an example of the line voltage when an output voltage in FIG. 11 is corrected with a first correction amount or a second correction amount.

FIG. 12 is a graph for showing an example of the line voltage when the output voltage is corrected with the first correction amount or the second correction amount in FIG. 11. Part (A) of FIG. 12 is a graph for showing an example of the first signal wave and the second signal wave with the dead time corrected with the first correction amount or the second correction amount. Part (B) of FIG. 12 is a graph for showing an example of the line voltage and the current flowing through the electric motor when the second correction amount is used. Part (C) of FIG. 12 is a graph for showing the line voltage when the first correction amount is used, the current flowing through the DC brushless motor, and the output current flowing through the electric motor with no influence of the dead time Td. As shown in FIG. 12, when the second correction amount Vd2 is used, the correction amount is larger than that in the case where the correction is performed with the first correction amount Vd1, and hence a command is such that the output voltage Vout is increased correspondingly. Therefore, even for the signal wave, an amplitude becomes larger in the case where the second correction amount Vd2 is used than in the case where the first correction amount Vd1 is used, resulting in the increased ON time of the output voltage Vout. In this manner, stable output control can be performed.

According to Embodiment 5 described above, the PWM signal is generated by using the second correction amount Vd2 under the light load state. As a result, based on the fact that the ON time increases and the OFF time decreases under the light load state, the ON time of the output voltage Vout is increased to prevent the occurrence of distortion in the output current. As a result, an efficient operation can be performed.

Embodiment 6

Figure 13:
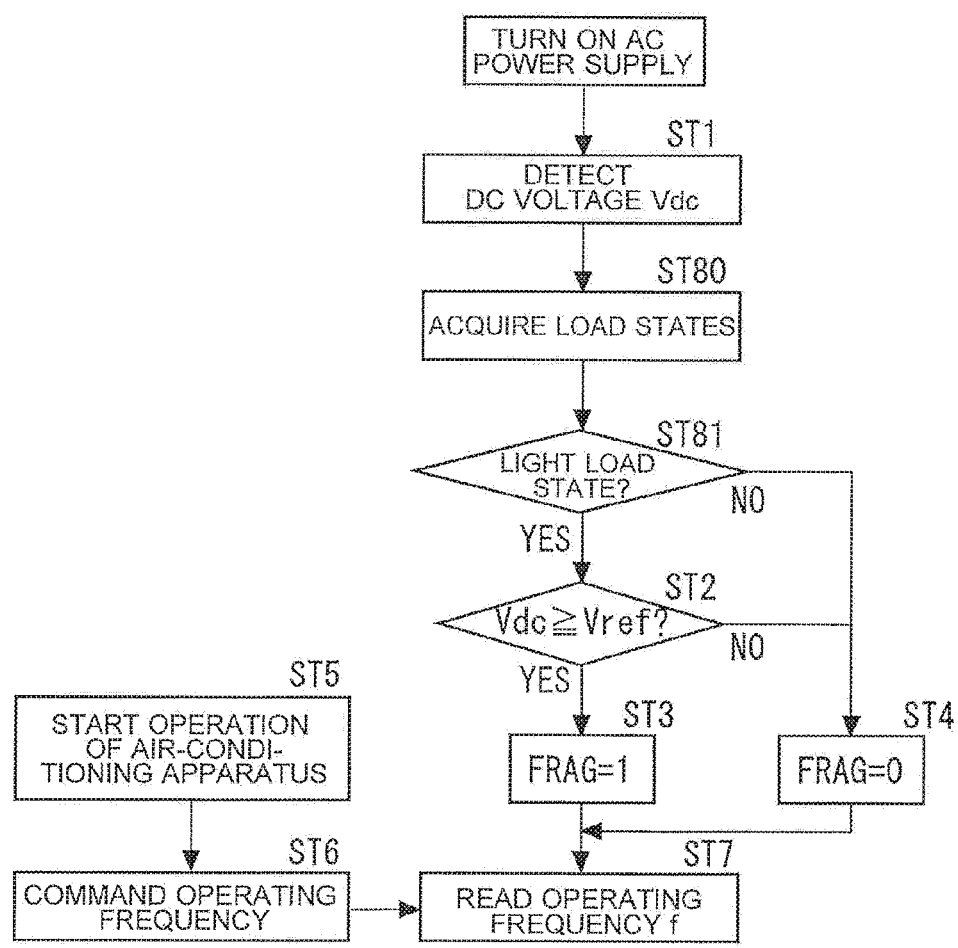
FIG. 13 is a flowchart for illustrating an operation example of a drive controller of an air-conditioning apparatus or a refrigerating and air-conditioning apparatus according to Embodiment 6 of the present invention.

FIG. 13 is a flowchart for illustrating an operation example of a drive controller of an air-conditioning apparatus or refrigerating and air-conditioning apparatus according to Embodiment 6 of the present invention. Referring to FIG. 13, an operation example of the drive control in Embodiment 6 is described. In the operation example of the drive controller illustrated in FIG. 13, portions having the same configurations or steps as those of FIG. 1 to FIG. 12 are denoted by the same reference symbols, and description thereof is herein omitted. Embodiment 6 illustrated in FIG. 13 differs from Embodiments 1 to 5 illustrated in FIG. 1 to FIG. 12 in that a control method is switched in view of the load state of the air-conditioning apparatus or refrigerating and air-conditioning apparatus 100.

Specifically, in FIG. 13, the inverter controller 31 acquires the suction pressure, the discharge pressure, and the outside-air temperature that are detected by the suction pressure detector 11, the discharge pressure detector 12, and the outside-air temperature detector 17, respectively, as load states (Step ST80). In the inverter controller 31, set threshold values of the load states, which are preset, are stored. The inverter controller 31 compares the outside-air tempera-ture, the discharge pressure, and the suction pressure with their respective set threshold values (Step ST81). Thereafter, in a case of the light load state in which the outside-air temperature, the discharge pressure, and the intake pressure are equal to or smaller than their respective set threshold values (YES in Step ST81), when the DC voltage Vdc is equal to or larger than the sec voltage threshold value Vref (Step ST2), the light load state is determined, and hence the fixed-value setting flag FRAG=1 is set (Step ST3). Meanwhile, when any one of the outside-air temperature, the discharge pressure, and the suction pressure is larger than the set threshold value (NO in Step ST81), the fixed-value setting flag FRAG=0 is set (Step ST4). Thereafter, the operation is controlled in accordance with the operating frequency f and the value of the fixed-value setting flag FRAG as described in Embodiments 1 to 5.

The operating state of the air-conditioning apparatus or refrigerating and air-conditioning apparatus 100 is varied in accordance with the outside-air temperature, the number of driven indoor units, or a driving load. For example, when the outside-air temperature is low, in the air-conditioning apparatus or refrigerating and air-conditioning apparatus, the pressure of the refrigerant decreases in accordance with a general refrigerant saturating temperature table. The discharge pressure and the suction pressure of the compressor 2 depend on the pressure of the refrigerant. Therefore, when the outside-air temperature decreases, the discharge pressure and the suction pressure also decrease. Thus, the compressor 2 operates in the operating state based on the light load state in which the discharge pressure and the suction pressure are low.

Figure 14:
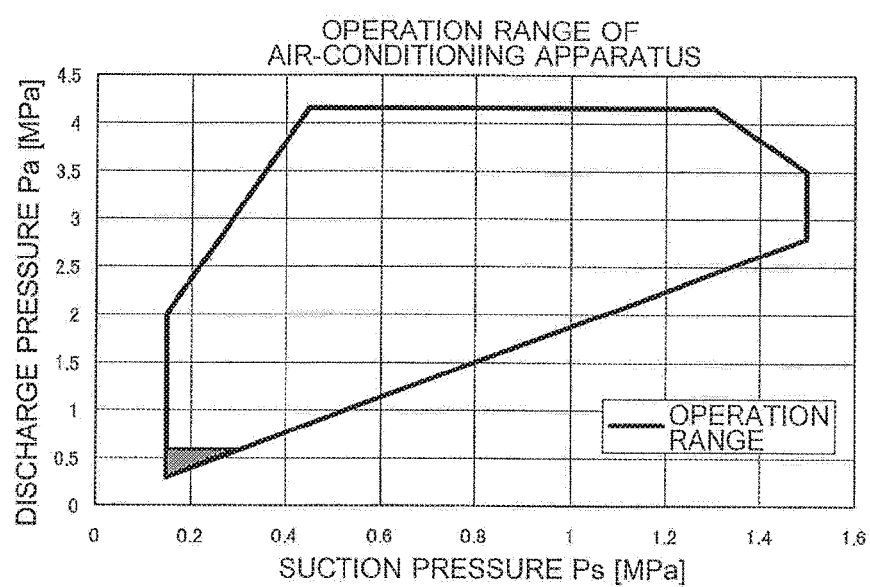
FIG. 14 is a graph for showing a relationship between a discharge pressure and a suction pressure within an operation range when R410A refrigerant is used as refrigerant.

According to Embodiment 6 described above, the light load state is reliably detected such that the occurrence of distortion in the output current is prevented in the light load state. As a result, an efficient operation can be performed. For example, FIG. 14 is a graph for showing a relationship between the discharge pressure and the suction pressure within an operating range when R410A refrigerant is used as the refrigerant. In FIG. 14, the light load state in which the outside-air temperature is low and the discharge pressure and the suction pressure are decreased is shown on the lower left as a hatched operation range. Therefore, the outside-air temperature is read so as to be used for the detection as a set value. As a result, the light load state can be detected. Further, the discharge pressure is used for the detection as a set value. As a result, the light load state can be detected. A mode in which the outside-air temperature and the discharge pressure are used to detect the light load state is a state specific to the air-conditioning apparatus or refrigerating and air-conditioning apparatus 100.

The invention claimed is:

1. An electric motor drive device configured to control drive of an electric motor, comprising:
   a converter configured to convert an AC voltage supplied from an AC power supply into a DC voltage;
   an inverter configured to convert the DC voltage converted by the converter into an output voltage being an AC so as to apply the output voltage to the electric motor;
   a voltage detector configured to detect a value of the DC voltage applied to the inverter; and
   a drive controller configured to control an operation of the inverter,
   the drive controller including
      a frequency setting unit configured to set an operating frequency of the electric motor, a frequency determining unit configured to determine whether or not the operating frequency set in the frequency setting unit is equal to or lower than a set frequency threshold value, a voltage determining unit configured to determine whether or not the value of the DC voltage is equal to or larger than a set voltage threshold value, and an inverter controller configured to control the inverter based on the operating frequency set in the frequency setting unit the inverter controller being configured as one of configurations including a configuration (a) in which the inverter controller has a function of setting a first carrier frequency and a second carrier frequency having a lower frequency than the first carrier frequency, and when the operating frequency is determined to be equal to or lower than the set frequency threshold value and the value of the DC voltage is determined to be equal to or larger than the set voltage threshold value, the inverter controller controls the inverter by using the second carrier frequency, a configuration (b) in which the inverter controller has a function of setting a first dead time and a second dead time having a shorter period of time than the first dead time, and when the operating frequency is determined to be equal to or lower than the set frequency threshold value and the value of the DC voltage is determined to be equal to or larger than the set voltage threshold value, the inverter controller controls the inverter by using the second dead time, and a configuration (c) in which the inverter controller is configured to store a first correction amount and a second correction amount for a larger amount of increase than the first correction amount, for correcting the output voltage, and when the operating frequency is determined to be equal to or lower than the set frequency threshold value and the value of the DC voltage is determined to be equal to or larger than the set voltage threshold value, the inverter controller corrects the output voltage by using the second correction amount.

2. The electric motor drive device of claim 1, wherein, when the operating frequency is determined to be equal to or lower than the set frequency threshold value and the value of the DC voltage is determined to be equal to or larger than the set voltage threshold value, the inverter controller controls the inverter so that the output voltage becomes equal to a preset fixed output voltage.

3. The electric motor drive device of claim 2, wherein, when the operating frequency is determined to be higher than the set frequency threshold value or the DC voltage is determined to be smaller than the set voltage threshold value, the inverter controller controls the inverter through vector control.

4. The electric motor drive device of claim 1, wherein, when the operating frequency is determined to be equal to or lower than the set frequency threshold value and the value of the DC voltage is determined to be equal to or larger than the set voltage threshold value, the inverter controller performs rectangular-wave control.

5. The electric motor drive device of claim 4, wherein, when the operating frequency is determined to be higher than the set frequency threshold value or the DC voltage is determined to be smaller than the set voltage threshold value, the inverter controller performs sine-wave control.

6. The electric motor drive device of claim 1, wherein, when the operating frequency is determined to be higher than the set frequency threshold value or the value of the DC voltage is determined to be smaller than the set voltage threshold value, the inverter controller having the configuration (a) controls the inverter by using the first carrier frequency having the lower frequency.

7. The electric motor drive device of claim 1, wherein, when the operating frequency is determined to be higher than the set frequency threshold value or the value of the DC voltage is determined to be smaller than the set voltage threshold value, the inverter controller having the configuration (b) controls the inverter by using the first dead time having a shorter period of time.

8. The electric motor drive device of claim 1, wherein, when the operating frequency is determined to be higher than the set frequency threshold value or the value of the DC voltage is determined to be smaller than the set voltage threshold value, the inverter controller having the configuration (c) controls the inverter by using the first correction amount.

9. An air-conditioning apparatus or refrigerating and air-conditioning apparatus, comprising:

a refrigerant circuit formed by connecting a compressor including the electric motor, a condenser, an expansion device, and an evaporator by a refrigerant pipe; and the electric motor drive device of claim 1 configured to drive the electric motor of the compressor.

10. The air-conditioning apparatus or refrigerating and air-conditioning apparatus of claim 9, further comprising a discharge pressure detector configured to measure a discharge pressure of refrigerant discharged from the compressor, wherein, when the discharge pressure detected by the discharge pressure detector is determined to be equal to or smaller than a set threshold value when the operating frequency is determined to be equal to or lower than the set frequency threshold value and the voltage determining unit determines that the DC voltage is equal to or larger than the set voltage threshold value, the inverter controller controls the inverter so as to suppress distortion of the output current.

* * * * *